United States Patent [19]
Yanagisawa et al.

[11] Patent Number: 5,239,398
[45] Date of Patent: Aug. 24, 1993

[54] LIQUID CRYSTAL DEVICE WITH PHENYLENEVINYLENE OR PHENYLENE SULFIDE ALIGNMENT FILMS HAVING PARTICULAR HIGH ELECTRICAL CONDUCTIVITY

[75] Inventors: Yoshihiro Yanagisawa, Atsugi; Hiroshi Matsuda, Isehara; Hideyuki Kawagishi, Ayase; Ken Eguchi, Yokohama, all of Japan

[73] Assignee: Canon Kabushiki Kaisha, Tokyo, Japan

[21] Appl. No.: 668,209

[22] Filed: Mar. 12, 1991

[30] Foreign Application Priority Data

| Mar. 15, 1990 [JP] | Japan | 2-62562 |
| Mar. 15, 1990 [JP] | Japan | 2-62563 |
| Mar. 6, 1991 [JP] | Japan | 3-063690 |

[51] Int. Cl.$^5$ .................... G02F 1/1337; C09K 19/00
[52] U.S. Cl. ........................... 359/76; 359/75; 359/78; 428/1
[58] Field of Search ............... 350/341, 350 S; 359/75, 359/76, 78; 428/1

[56] References Cited

U.S. PATENT DOCUMENTS

| 4,367,924 | 1/1983 | Clark et al. ............... 350/350 S |
| 4,561,726 | 12/1985 | Goodby et al. ............ 359/75 |
| 4,655,561 | 4/1987 | Kanbe et al. .............. 359/100 X |
| 4,883,344 | 11/1989 | Okada et al. ............. 359/75 |
| 4,939,003 | 7/1990 | Aoki et al. ............... 350/341 |
| 5,009,489 | 4/1991 | Eguchi et al. ............ 359/75 |
| 5,046,822 | 9/1991 | Matsuda et al. .......... 359/77 X |

FOREIGN PATENT DOCUMENTS

| 0070815 | 5/1980 | Japan ................... 350/341 |
| 56-107216 | 8/1981 | Japan . |
| 0049023 | 2/1989 | Japan ................... 359/56 |

Primary Examiner—William L. Sikes
Assistant Examiner—Anita Pellman Gross
Attorney, Agent, or Firm—Fitzpatrick, Cella, Harper & Scinto

[57] ABSTRACT

A liquid crystal device comprises a pair of opposing substrates and a liquid crystal rendering a chiral smectic phase, disposed between said pair of substrates, wherein at least one of the substrates is provided with an alignment film comprising a polymer containing a skeleton selected from the group consisting of acetylene, phenylene, phenylenevinylene, phenylenexylidene, benzyl, phenylene sulfide, dimethylparaphenylene sulfide, thienylene, furan, selenophene, vinylpyridine, vinylnaphthalene, vinylferrocene, vinylcarbazole, phenylene oxide, phenylene selenide, heptadiyne, benzothiophene, thiophene, pyrrole, aniline and naphthylene. The liquid crystal device is used for a display system and effects a high contrast display without after-image.

29 Claims, 14 Drawing Sheets

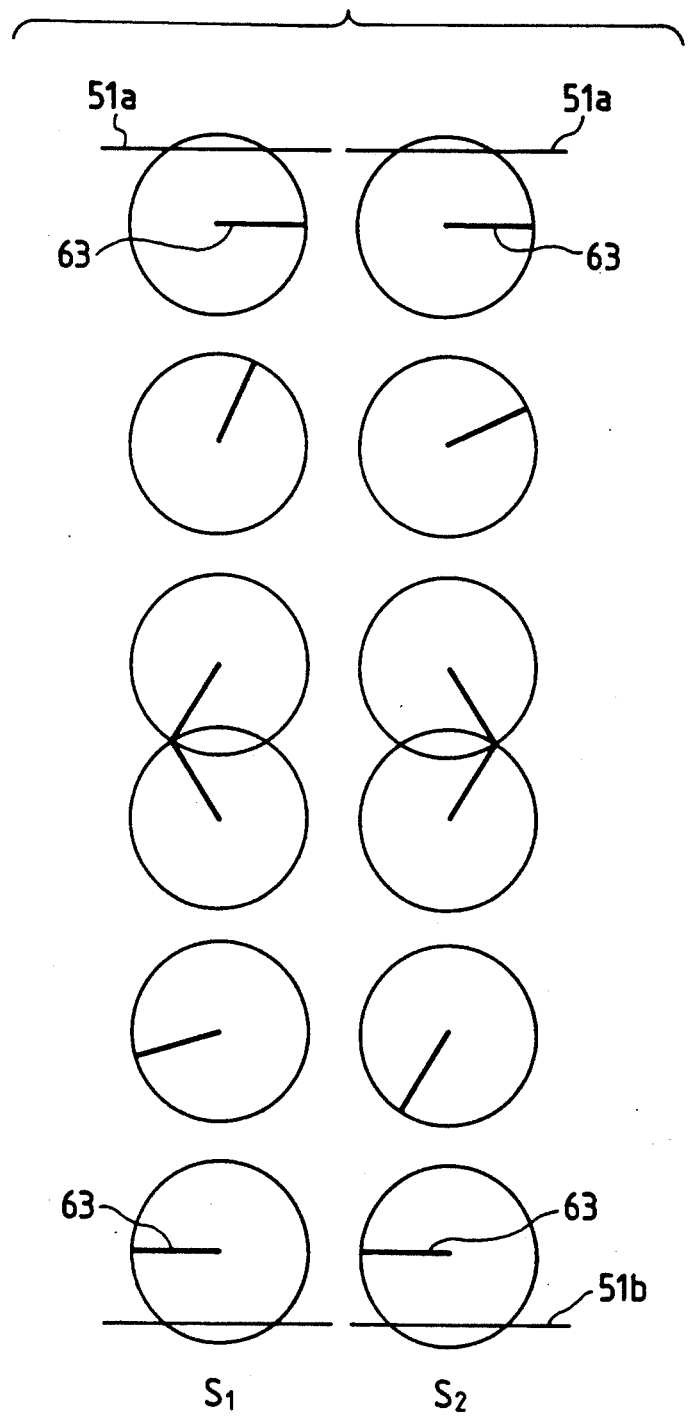

LIQUID CRYSTAL DEVICE WITH PHENYLENEVINYLENE OR PHENYLENE SULFIDE ALIGNMENT FILMS HAVING PARTICULAR HIGH ELECTRICAL CONDUCTIVITY

BACKGROUND OF THE INVENTION

1. Field of the Invention

The present invention relates to a liquid crystal device used in a liquid crystal display device, a liquid crystal optical shutter or the like. More particularly the present invention is concerned with a liquid crystal device having achieved an improvement of alignment characteristics of liquid crystal molecules, and a display system in which such a liquid crystal device is used for display.

2. Related Background Art

Clark and Lagerwall have proposed a display device of the type the refractive index anisotropy of ferroelectric liquid crystal molecules is utilized and transmitted light rays are controlled by its combination with a polarizer (see Japanese patent Application Laid-open No. 56-107216 and U.S. Pat. No. 4,367,924). This ferroelectric liquid crystal commonly has a chiral smectic C phase (Sm*C) or H phase (Sm*H) of non-spiral structure in a specific temperature range, and, under such a state, has the properties of assuming either a first optically stable state or a second optically stable state in response to an electric field applied and also maintaining that state when no electric field is applied, in other words, the bistable state (or two stable states). This ferroelectric liquid crystal also has a quick response to changes in electric fields, and is expected to be widely utilizable as a display device of a high-speed and memory type. In particular, in view of its function, it is expected applicable as a display device with a large screen and high resolution.

In order for an optical modulation device making use of such a bistable liquid crystal to exhibit drive characteristics, a liquid crystal disposed between a pair of parallel substrates is required to be in the state of molecular orientation that the conversion between the above two stable states may effectively take place.

In the case of a liquid crystal device in which the double refraction of a liquid crystal is utilized, the transmittance under cross polarization is expressed by:

$$I/I_0 = \sin^2 4\theta \sin^2 \frac{\Delta nd}{\lambda} \pi$$

wherein
$I_0$: incident light intensity.
$I$: transmitted light intensity.
$\theta$: tilt angle
$\Delta n$: refractive index anisotropy
$d$: film thickness of a liquid crystal layer,
$\lambda$: wavelength of incident light.

Thus, the tilt angle $\theta$ in the above non-spiral structure is present as an angle in the direction of an average molecular axis of liquid crystal molecules twisting oriented in the first and second states of alignment. According to the above expression, the transmittance reaches a maximum when the tilt angle $\theta$ is at an angle of 22.5°. and hence a tilt angle $\theta$ in the non-spiral structure that effects the bistable state is required to be as near as possible to 22.5°.

Incidentally, as a method of aligning ferroelectric liquid crystal, a liquid crystal molecular layer formed of a plurality of molecules that form a smectic liquid crystal over a large area must be monoaxially aligned along its normal and hence a polyimide film usually having been subjected to rubbing has been widely used. In particular, the method as disclosed, for example, in U.S. Pat. No. 4,561,726 is known as a method of aligning a chiral smectic liquid crystal of non-spiral structure. However, in instances in which hitherto available alignment methods using a polyimide film having been subjected to rubbing are applied to the above bistable ferroelectric liquid crystal of non-spiral structure as reported by Clark and Lagerwall, there are the following problems.

That is to say, experiments made by the present inventors revealed that a tilt angle $\theta$ (the angle shown in FIG. 3 as described later) in ferroelectric liquid crystal of non-spiral structure obtained by making alignment using the conventional polyimide film having been subjected to rubbing becomes smaller than a tilt angle $\widehat{H}$ (the angle of ½ of a vertical angle of a trigonal pyramid shown in FIG. 2, as described later) in a ferroelectric liquid crystal of spiral structure. In particular the tilt angle $\theta$ in a ferroelectric liquid crystal of non-spiral structure obtained by making alignment using the conventional polyimide film having been subjected to rubbing was approximately 3° to 8° in general, and the transmittance at that time was approximately 3 to 5% at best.

Thus, according to Clark and Lagerwall, the tilt angle in a ferroelectric liquid crystal of non-spiral structure that effects the bistable state should be the same angle as the tilt angle in a ferroelectric liquid crystal of spiral structure. In practice, however, the tilt angle $\theta$ in the non-spiral structure is smaller than the tilt angle $\widehat{H}$ in the spiral structure. It was also revealed that the reason why the tilt angle $\theta$ in the non-spiral structure is smaller than the tilt angle $\widehat{H}$ in the spiral structure is ascribable to the twisted orientation of liquid crystal molecules in the non-spiral structure. More specifically, in the ferroelectric liquid crystal of non-spiral structure, liquid crystal molecules are, as shown in FIG. 4, twistingly oriented in a continuous form at a twist angle $\delta$, which is twisted from an axis 42 of a liquid crystal molecule adjacent& to an upper substrate toward an axis 43 of a liquid crystal molecule adjacent to a lower substrate (i.e., in the direction 44 of twisted orientation), with respect to the normal of each substrate. This is the reason why the tilt angle $\theta$ in the non-spiral structure becomes smaller than the tilt angle $\widehat{H}$ in the spiral structure.

In FIG. 4, the numeral 41 denotes a monoaxial alignment axis formed on upper and lower substrates obtained by rubbing or oblique vacuum deposition.

In the instance where a chiral smectic liquid crystal is aligned using a conventional polyimide alignment film having been subjected to rubbing, the polyimide alignment film is present as an insulating layer between an electrode and a liquid crystal layer. Hence, when a voltage with one polarity is applied so that the first optically stable state (for example, a state of the display in white) is switched to the second optically stable state (for example, e state of the display in black), a reverse electric field $V_{rev}$ with the other polarity is produced in a ferroelectric liquid crystal layer after removal of the application of this voltage with one polarity, and this reverse electric field $V_{rev}$ has often caused an after-image at the time of display. (see, yoshida Akio. "Switching Characteristics of SSFLC", Proceedings for Liquid Crystal Forum, p. 142-143, October, 1987.

SUMMARY OF THE INVENTION

The present invention was made in order to solve the problems involved in the prior art. In particular, an object of the present invention is to provide a liquid crystal device having a chiral smectic phase, and a display system that can produce a large tilt angle $\theta$ in the non-spiral structure of a chiral smectic liquid crystal, enables display of an image with a high contrast, and also can achieve display that may cause no after-image.

The present invention provides a liquid crystal device comprising a pair of opposing substrates and a liquid crystal rendering a chiral smectic phase disposed between said pair of substrates, wherein at least one of said substrate is provided with an alignment film comprising a polymer containing a skeleton selected from the group consisting of acetylene, phenylene, phenylenevinylene, phenylenexylidene, benzyl, phenylene sulfide, dimethylparaphenylene sulfide, thienylene, furan, selenophene, vinylpyridine, vinylnaphthalene, vinylferrocene, vinylcarbazole, phenylene oxide, phenylene selenide, heptadiyne, benzothiophene thiophene, pyrrole, aniline and naphthylene. The present invention also provides a display system comprising such a liquid crystal device.

BRIEF DESCRIPTION OF THE DRAWINGS

FIG. 7 illustrates C-directors of a state of spray alignment.

DESCRIPTION OF THE PREFERRED EMBODIMENTS

Figure 1:
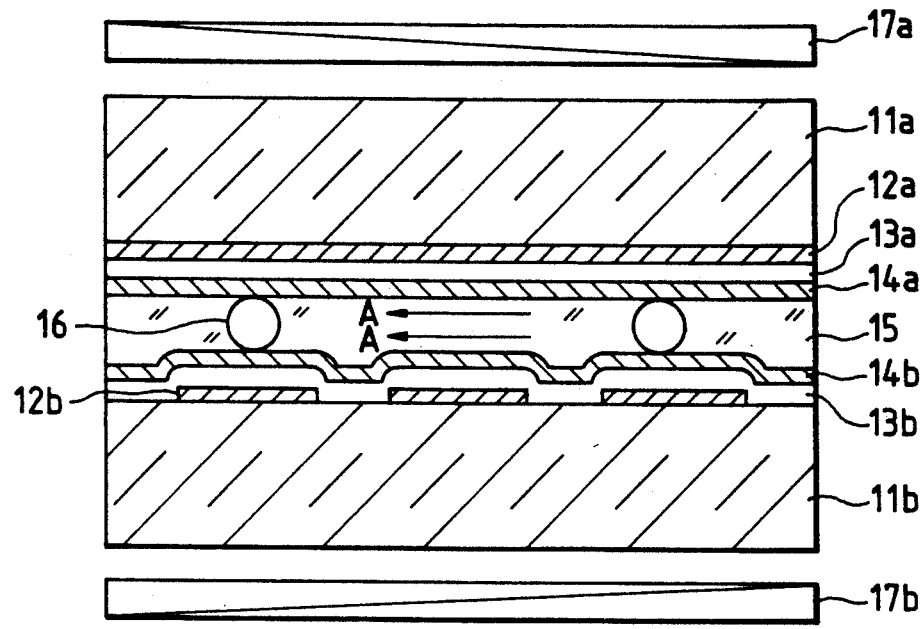
FIG. 1 is a diagrammatic illustration of a ferroelectric liquid crystal device according to the present invention.

FIG. I diagrammatically illustrates a ferroelectric liquid crystal device according to the present invention. In FIG. 1, the numerals 11a and 11b denote glass substrates covered with transparent electrodes 12a and 12b made of $In_2O_3$, ITO (indium-tin oxide) or the like, respectively. Insulating films 13a and 13b (e.g., $SiO_2$ films, $TiO_2$ films. $Ta_2O_5$ films) of 200 to 1,000 Å thick and alignment films 14a and 14b formed Of the polymer described above are laminated thereon, respectively. A liquid crystal 15 rendering a chiral smectic phase is disposed between the alignment films 14a and 14b. The distance between them is set to be a distance (for example, 0.1 μm to 3 μm) small enough to control the formation of a spiral structure of the chiral smectic liquid crystal 15. The liquid crystal 15 rendering the chiral smectic phase has produced a bistably aligned state. The above small enough distance between which the chiral smectic liquid crystal 15 is disposed is retained using a beads spacer 16 (e.g., silica beads, alumina beads) disposed between the alignment films 14a and 14b. The numerals 17a and 17b denote polarizing plates.

The alignment films used in the present invention can be formed by the conventionally known Langmuir-Brodgett process, vacuum deposition or coating to give a monomolecular built-up film, a deposited film or a coating film.

In the case when the alignment film is formed by the Langmuir-Brodgett process, the film thickness should be controlled to be approximately from 4 Å to 80 Å, and preferably from 16 Å to 32 Å. With regard to the direction in which a substrate is drawn up when the alignment film is formed, the film should be formed in such a manner that the drawn-up directions for the upper and lower substrates may be the same directions when they are framed into a cell (e.g., the directions A shown in FIG. I).

The alignment film formed by vacuum deposition or coating should have a film thickness of usually from 50 Å to 2,000 Å, and preferably from 100 Å to 200 Å.

To form the alignment film, a film comprised of a polymer is used, which polymer may preferably comprise a polymer containing at least one skeleton selected from acetylene, phenylene, phenylenevinylene, phenylenexylidene, benzyl, phenylene sulfide, dimethylparaphenylene sulfide, thienylene, furan, selenophene, vinylpyridine, vinylnaphthalene, vinylferrocene, vinylcarbazole, phenylene oxide, phenylene selenide, heptadiyne, benzothiophene, thiophene, pyrrole, aniline and naphthylene.

Stated specifically, such a polymer may preferably include polyacetylene, polydiacetylene, polyparaphenylene polymethaphenylene. polyparaphenylenevinylene, polyparaphenylenexylidene, polybenzyl, polyparaphenylene sulfide, polydimethylparaphenylene sulfide, polythienylene, polyfuran polyselenophene, poly-2-vinylpyridine poly-1-vinylnaphthalene, poly-2-vinylnaphthalene. polyvinylferrcoene, poly-N-vinylcarbazole, polyparaphenylene oxide, polyparaphenylene selenide, poly-1,6-heptadiyne, polybenzothiophene, polythiophene, polypyrrole, polyaniline and polynaphthylene.

The polymer of the present invention may further have a substituent so long as it has the key skeleton described above. Such a substituent includes, for example, the following:

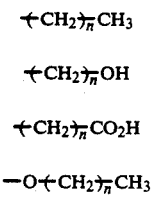

(wherein n represents an integer of 0 to 10)

In the case when the organic film (alignment film) is formed as a monomolecular built-up film, the polymer should particularly preferably have the substituents $-(CH_2)_n-CH_3$ and $-(CH_2)_n-CO_2H$ in combination.

From the viewpoint of more satisfactory prevention ⓒf the after-image ascribable to a reverse electric field, the organic film of the present invention should preferably be formed of a fi m so polymerized that it is made conductive to have a conductivity greater than $10^{-8}$ $\Omega^{-1}cm^{-1}$.

The substrate on which the alignment film comprising the above polymer is used in both of a pair of opposing substrates or one of the substrates.

Liquid crystal materials used in the present invention may preferably be liquid crystals that produce a chiral smectic C phase through an isotropic phase, a cholesteric phase, and a smectic A phase in the course of temperature drop. Particularly preferred is a liquid crystal having a pitch of not less than 0.8 μm when it is in a cholesteric phase (the pitch in a cholesteric phase is measured at the middle in the temperature range of the cholesteric phase). Preferably usable specific liquid crystal materials are liquid crystal compositions incorporated with the following liquid crystal materials "LC-1", "80B" and "80SI*" in the following proportions.

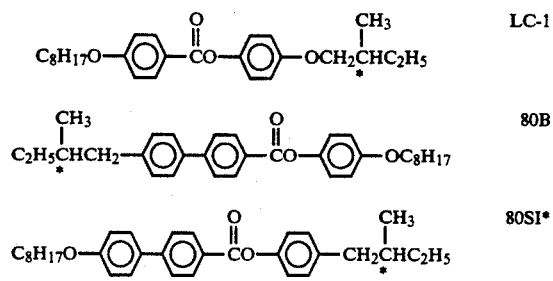

Liquid crystal
(1) (LC-1)90/(80B)10
(2) (LC-1)80/(80B)20
(3) (LC-1)70/(80B)30
(4) (LC-1)60/(80B)40
(5) 80SI*

-continued
(In the above, the mixing proportions are each expressed in weight ratio.)

Figure 2:
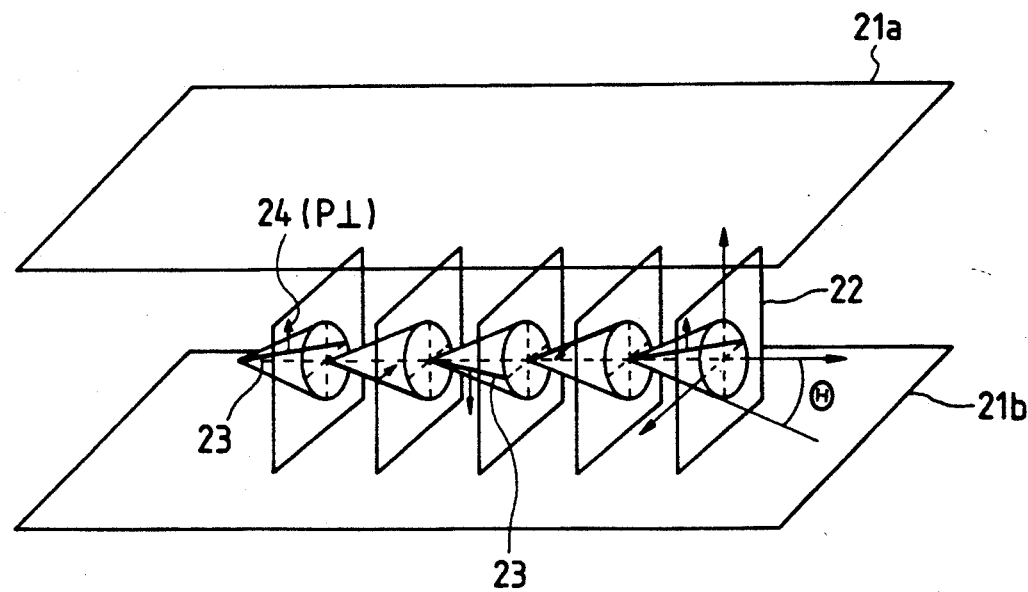
FIG. 2 is a perspective illustration of a state of alignment of a chiral smectic liquid crystal of spiral structure.

FIG. 2 is a diagramatical drawing of an example of a cell, to illustrate the operation that has utilized ferroelectric properties of the liquid crystal rendering a chiral smectic phase. The numerals 21a and 21b each denote a substrate (a glass plate) covered with a transparent electrode comprised of a thin film made of $In_2O_2$, $SnO_2$, ITO or the like. Between the substrates, a liquid crystal of an SmC* (chiral smectic C) phase or an SmH* (chiral smectic H) phase is sealed, which is so aligned &hat its liquid crystal molecular layer 22 may be perpendicular to the glass substrate surfaces. A line 23 shown by a thick line indicates a liquid crystal molecule. This liquid crystal molecule 23 has a dipole moment (P⊥) 24 in the direction falling at right angles with its molecule. The angle that forms here a vertical angle of a trigonal pyramid indicates the tilt angle (H) in the chiral smectic phase of such spiral structure. When a voltage higher than a given threshold value is applied between the electrodes provided on the substrates 21a and 21b, the spiral structure of the liquid crystal molecule 23 comes loose, and thus the liquid crystal molecule 23 can change its direction of alignment so that all Of dipole moments (P⊥) 24 face toward the direction of the electric field. The liquid crystal molecule 23 has a slender shape, and shows refractive index anisotropy between its direction of the major axis and direction of the minor axis. Hence, it can be easily understood that if, for example, polarizers which are in crossed nicols each other are placed on the glass substrate surfaces, there can be provided a liquid crystal optical modulation device capable of changing optical characteristics depending on the polarity of the applied voltage.

Figure 3:
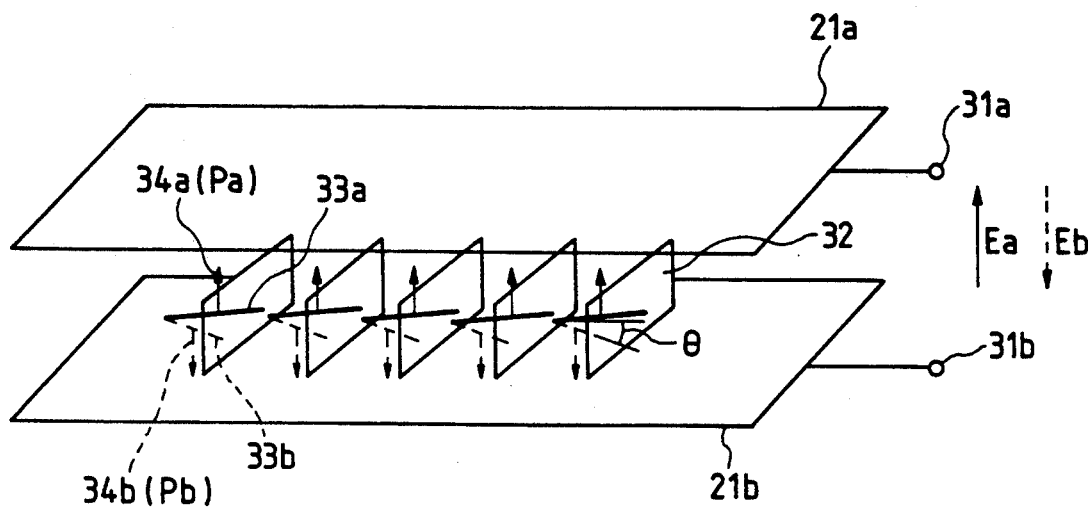
FIG. 3 is a perspective illustration of a state of alignment of a chiral smectic liquid crystal of non-spiral structure.
Figure 4:
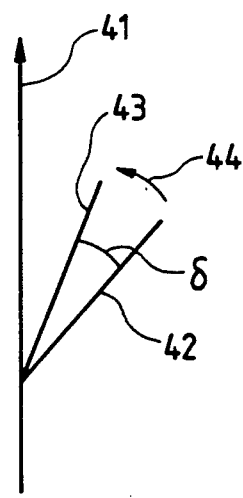
FIG. 4 is an illustration of the relationship between a monoaxial alignment axis of substrates and an axis of a ferroelectric liquid crystal molecule of non-spiral structure.

A surface stable type ferroelectric liquid crystal cell in the state of bistable alignment, which is used in the liquid crystal device of the present invention, can be made to have a sufficiently small thickness, for example, of from 0.1 μm to 3 μm. As the thickness of a liquid crystal layer becomes smaller in this way, the spiral structure of liquid crystal molecules comes loose even in the state where no electric field is applied, and turns to have a non-spiral structure, so that its dipole moment Pa or Pb results in either an upward state (34a) or a downward state (34b). as shown in FIG. 3. The numeral 32 denotes a perpendicular layer. When as shown in FIG. 3 an electric field Ea or Eb of a voltage higher than a given threshold value and having a different polarity is applied to such a cell through means of applying a voltage (31a) and (31b). the dipole moment changes its direction to an upward direction 34a or a downward direction 34b corresponding to the electric field vector of the electric field Ea or Eb, and, correspondingly therewith, the liquid crystal molecule are aligned in the direction of either a first stable state 33a or a second stable state 33b. The half (½) of the angle formed here by the first and second stable states corresponds to the tilt angle θ.

The effects obtainable from this ferroelectric liquid crystal cell are firstly that the response speed is very high, and secondly that the alignment of the liquid crystal molecules is bistable. The second effect will be further described with reference to, for example, FIG. 3. When the electric field Ea is applied, the liquid crystal molecules are aligned in the first stable state 33a and this state is stable even when the electric field has been removed. On the other hand, when the electric field Eb of a reverse direction is applied, the liquid crystal molecules are aligned in the second stable state 33b to change their direction and still remain in this state even when the electric field has been removed. The respective states of alignment are also maintained so long as the electric field Ea to be applied does not exceed a given threshold value.

Figure 5:
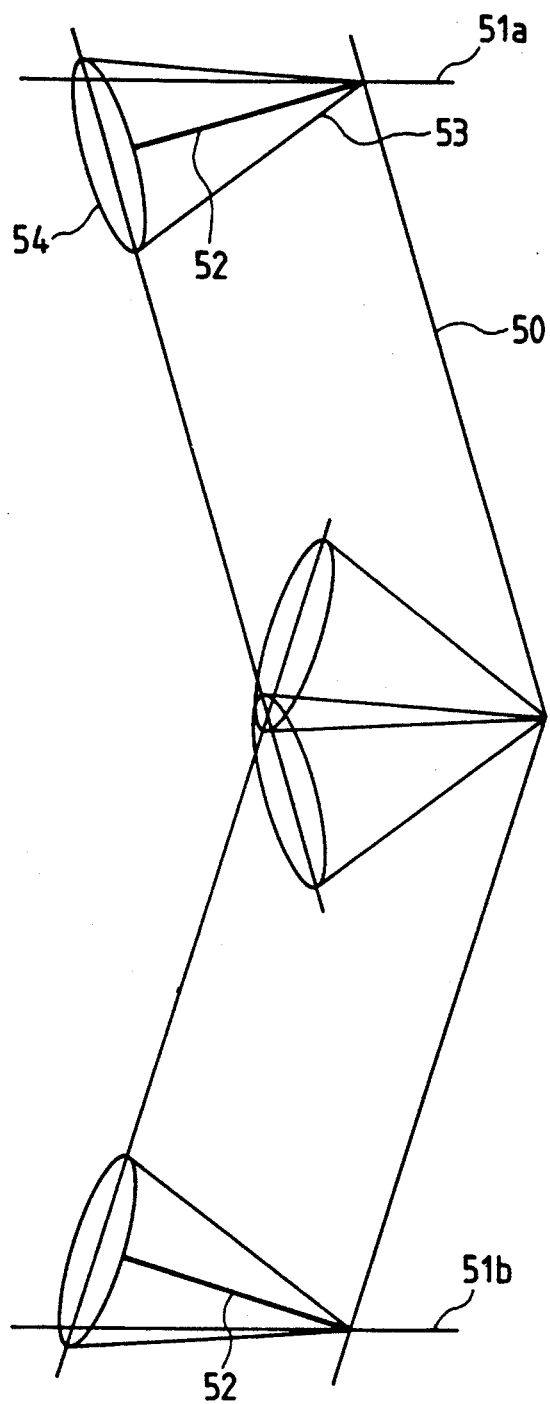
FIG. 5 is a cross-sectional illustration of a state of alignment Of a chiral smectic liquid crystal aligned according to an aligning method of the present invention.
Figure 6:
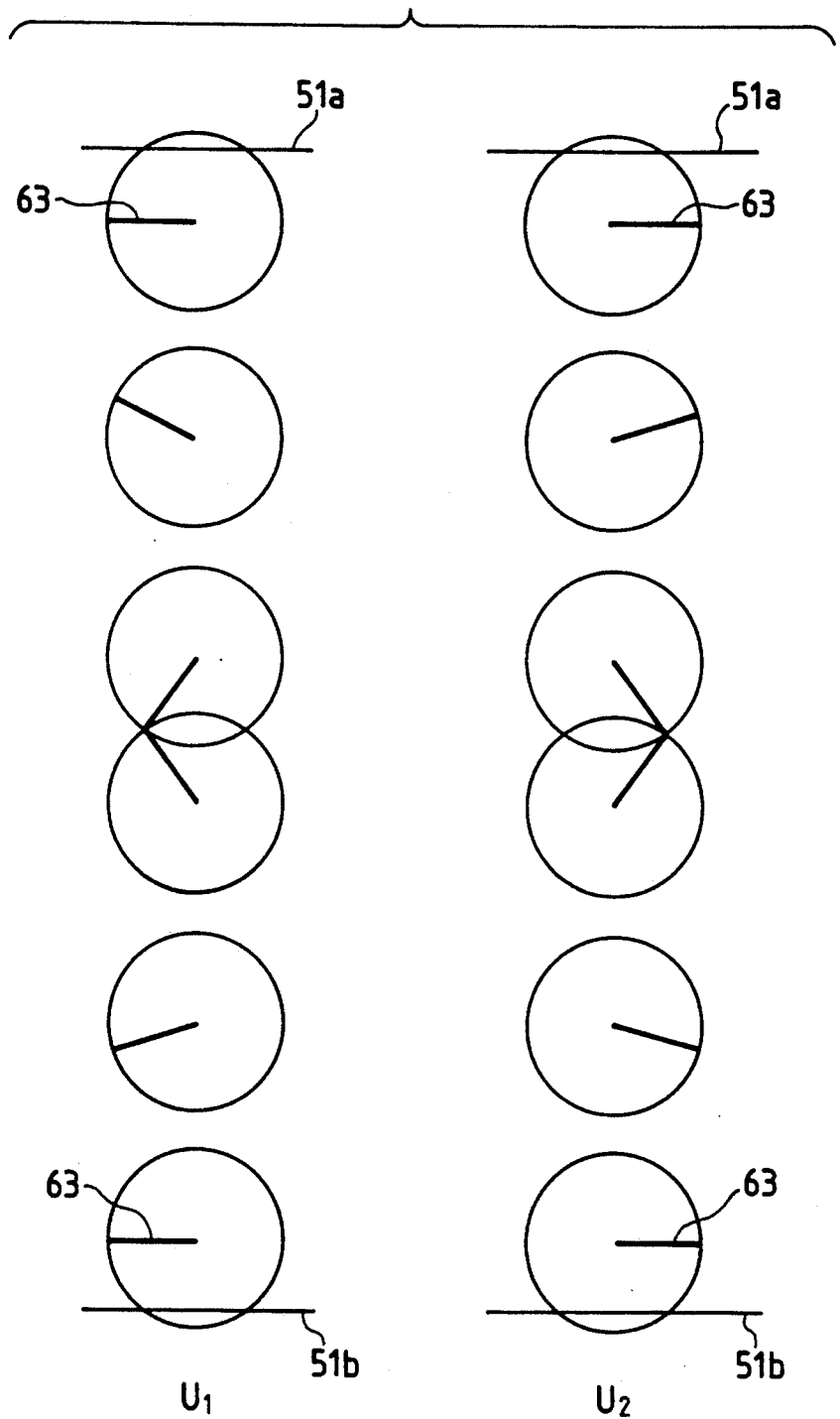
FIG. 6 illustrates 0-directors of its state of uniform alignment&.

FIG. 5 is a cross-sectional view to diagrammatically explain the state of alignment of liquid crystal molecules as produced by the method of alignment using the alignment film in the liquid crystal device according to the present invention. FIG. 6 illustrates the C-directors thereof.

The numerals 51a and 51b shown in FIG. 5 denote an upper subs&rate and a lower substrate, respectively. The numeral 50 denotes a liquid crystal molecular layer formed of liquid crystal molecules 52, and the liquid crystal molecules 52 are arranged with changes in their positions along the base 54 (circular) of a cone 53.

FIG. 6 illustrates C-directors. $U_1$ in FIG. 6 shows C-directors 63 which are in one state of stable alignment, and $U_2$, C-directors 63 which are the other state of stable alignment. Each C-director 63 is a projection of a molecular major axis on an imaginary face perpendicular to the normal of the liquid crystal molecular layer 50 shown in FIG. 5.

On the other hand, FIG. 7 shows the state of alignment as produced using a conventional polyamide film having been subjected to rubbing. For the state of alignment as shown in FIG. 7, the molecular axis is so largely twisted from the upper substrate 51a toward the lower substrate 51b that the tilt angle $\theta$ is small.

Figure 8A:
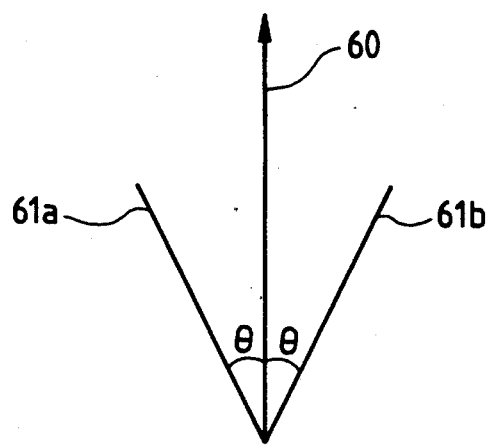
FIG. 8A is a view to illustrate a tilt angle $\theta$ in the state of uniform alignment.
Figure 8B:
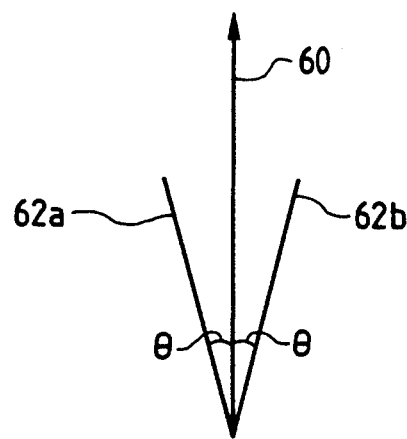
FIG. 8B is a view to illustrate a tilt angle $\theta$ in the state of spray alignment.

FIG. 8A is a view to show the tilt angle $\theta$ when the C-directors 63 are in the state of FIG. 6 (herein called "the state of uniform alignment"). and FIG. 8B is a view to show the tilt angle $\theta$ when the C-directors 63 are in the state of FIG. 7 (herein called "the state of spray alignment"). In FIGS. 8A and 8B, the numeral 60 denotes the direction in which a substrate is drawn up when the alignment film is formed by the Langmuir-Brodgett process, or the axis of rubbing treatment applied to the alignment film formed by vacuum deposition or coating. The numeral 61a denotes an average molecular axis formed in the state of alignment& $U_1$: 61b, an average molecular axis formed in the state of alignment $U_2$; 62a, an average molecular axis formed in the state of alignment $S_1$; and 62b, an average molecular axis formed in the state of alignment $S_2$. The average molecular axes 61a and 61b can be converted by applying a voltage of reverse polarity which exceeds a threshold voltage each other. The same may also takes place between the average molecular axes 62a and 62b.

Usefulness of the state of uniform alignment to the delay of optical response (after-image) caused by a reverse electric field $V_{rev}$ will be explained below. When the capacity of an insulating layer (alignment control film) of a liquid crystal cell is represented by $C_i$, the capacity of a liquid crystal layer by $C_{LC}$, and the spontaneous polarization of a liquid crystal by $P_s$, the $V_{rev}$ that causes the after-image is represented by the following expression:

$$V_{rev}=2 \cdot P_s/C_i + C_{LC}$$

Figure 9:
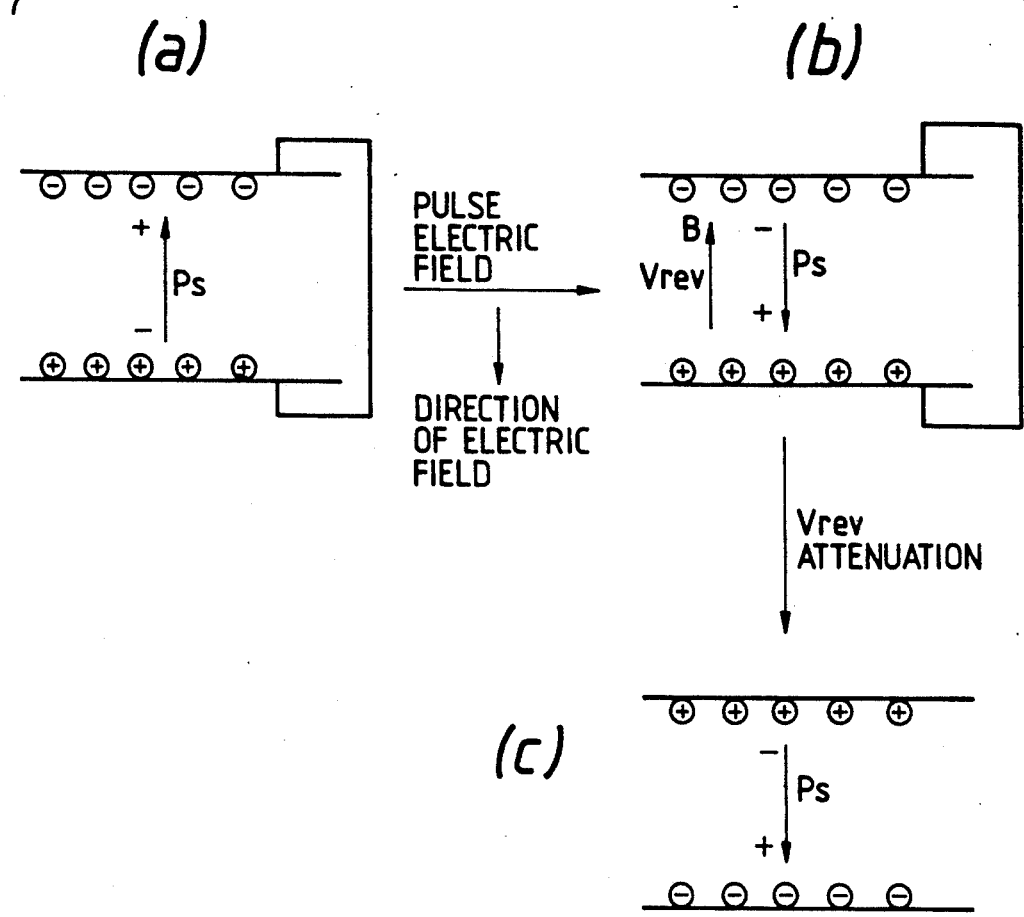
FIG. 9 shows a progressive series of cross-sectional illustrations of the distribution of electric charges in a ferroelectric liquid crystal, the direction of spontaneous polarization $P_s$ and the direction of a reverse electric field $V_{rev}$, respectively.

FIG. 9 shows cross-sectional views to diagrammatically illustrate the distribution of electric charges in a liquid crystal, the direction of spontaneous polarization $P_s$, and the direction of a reverse electric field $V_{rev}$, respectively. FIG. 9(a) shows the state of distribution of plus and minus electric charges in a memory state before application of a pulse electric field. At this time, the spontaneous polarization $P_s$ is in the direction from the plus electric charges to the minus electric charges. FIG. 9(b) shows the direction of the spontaneous polarization $P_s$ immediately after removal of the pulse electric field, where the spontaneous polarization $P_s$ is in a reverse direction to the direction in the state shown in FIG. 9(a) (hence, the liquid crystal molecules are reversed from the one state of stable alignment to the other state of stable alignment). Since, however, the state of distribution of plus and minus electric charges is the same as in the state shown in FIG. 9(a), a reverse electric field $V_{rev}$ is produced in the liquid crystal in the direction of an arrow B. This reverse electric field $V_{rev}$ disappears after a while as shown in FIG. 9(c), and the state of distribution of plus and minus electric charges is changed.

Figure 10:
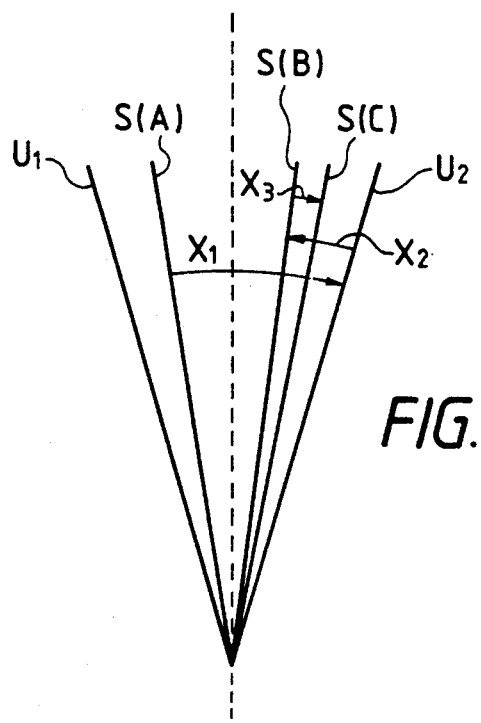
FIG. 10 is a view to illustrate changes of the tilt angle $\theta$ at the time of application of an electric field and after that time.
Figure 11:
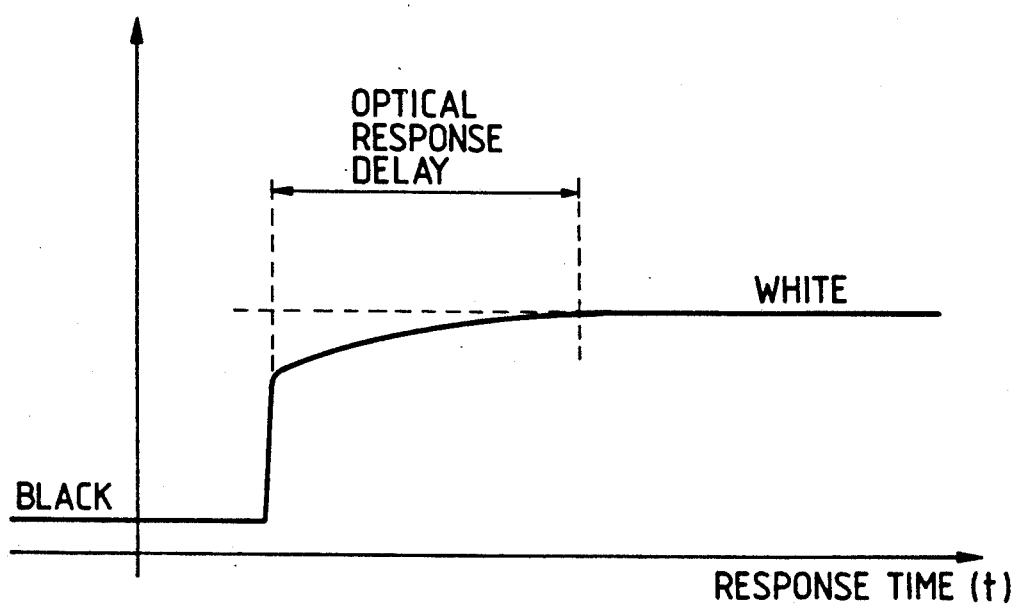
FIG. 11 is a graph to show optical response characteristics in a liquid crystal device of the prior art.

FIG. 10 illustrates changes of optical response occurring in the state of spray alignment as produced using a conventional polyimide alignment film, which are converted to changes of the tilt angle $\theta$. As shown in FIG. 10, when a pulse electric field is applied, the molecular axis is overshot from the average molecular axis S(A) formed in the state of spray alignment to the average molecular axis $U_2$ formed in the state of uniform alignment, which is in the vicinity of the maximum tilt angle (H) along the direction of an arrow $X_1$. Immediately after removal of the pulse electric field, the reverse electric field $V_{rev}$ as shown in FIG. 9(b) acts, and the tilt angle $\theta$ is decreased, along the direction of an arrow $X_2$, to the average molecular axis S(B) formed in the state of spray alignment. Then, a state of stable alignment can be obtained in which, because of the action of attenuation of the reverse electric field $V_{rev}$ as shown in FIG. 9(c), the tilt angle $\theta$ has been a little increased, along the direction of an arrow $X_3$, to the average molecular axis S(C) formed in the state of spray alignment. FIG. 11 is a graph to show a state of optical response obtained here.

According to the present invention, employment of the alignment film of the present invention does not bring about such a state of alignment of a liquid crystal that the average molecular axes S(A), S(B) and S(C) are formed in the state of spray alignment as shown in FIG. 10, and hence makes it possible to align a liquid crystal to form an average molecular axis that may give a tilt angle $\theta$ approximate to the maximum tilt angle H.

Figure 12:
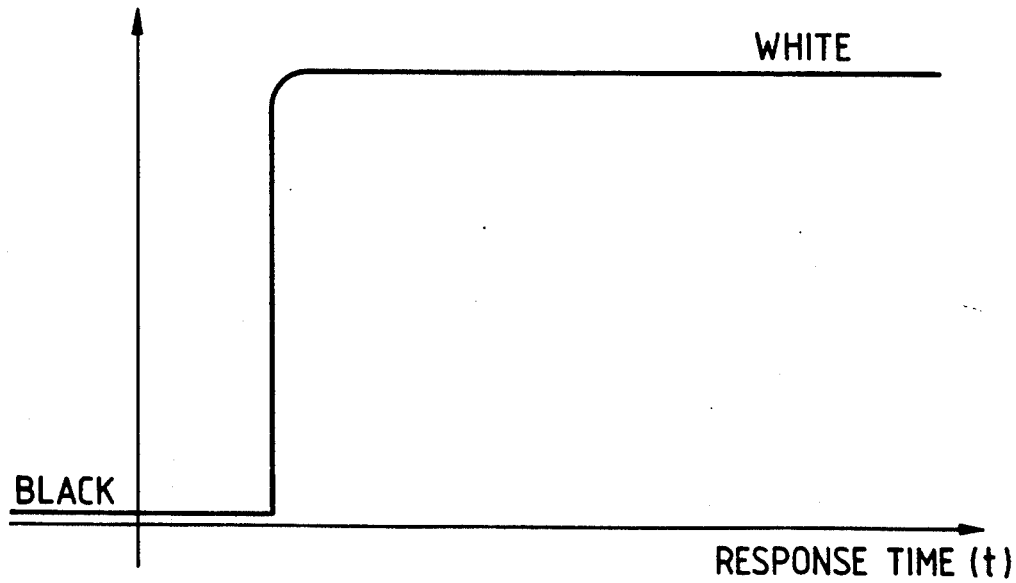
FIG. 12 is a graph to show optical response characteristics in a liquid crystal device of the present invention.

FIG. 12 is a graph to show a state of optical response obtained when &he alignment film of the present invention is used. As is seen from FIG. 12, no delay of optical response caused by the after-image occurs and also a high contrast is produced in a memory state.

In the liquid crystal device of the present invention, employment of the aligning method of a specific type as will be made clearer in the following Examples has achieved a state of alignment that gives a high optical ? contrast between a light state and a dark state, in particular, gives a high contrast to unselected picture elements at the ttime of the multiplexing drive as disclosed in U.S. Pat. No. 4,655,561, etc., and also, with utilization of the aspect that the alignment film comprises a conductive polymer, brings about no delay in optical response at the time of switching (at the time of multiplexing drive), which may cause the after-image at the time of display.

Figure 14:
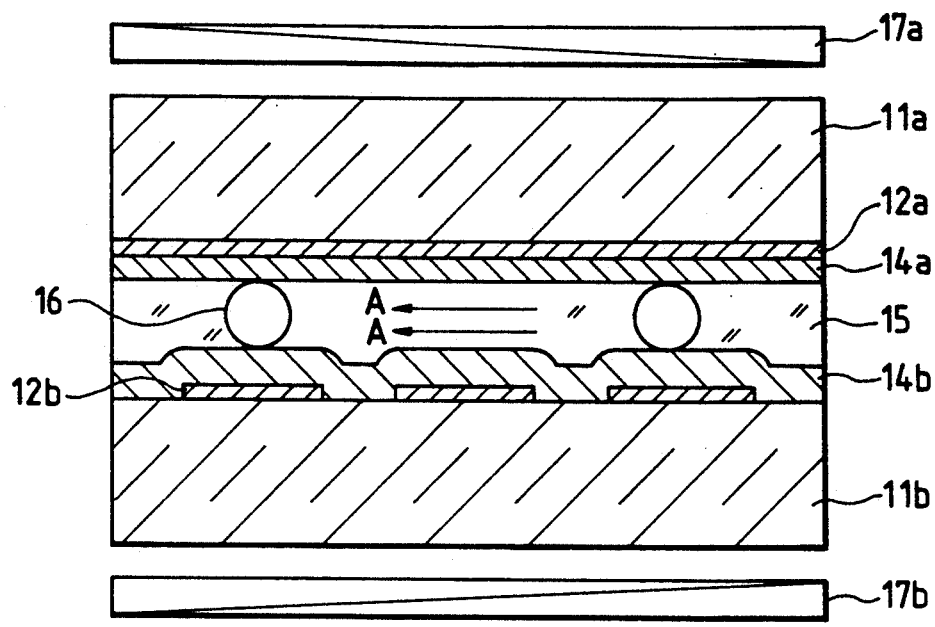
FIG. 14 is a diagrammatic illustration of another ferroelectric liquid crystal device according to the present invention.

FIG. 14 diagrammatically illustrates another liquid crystal device according to the present invention. The numerals denote the same as those previously set forth with reference to FIG. 1

Figure 15:
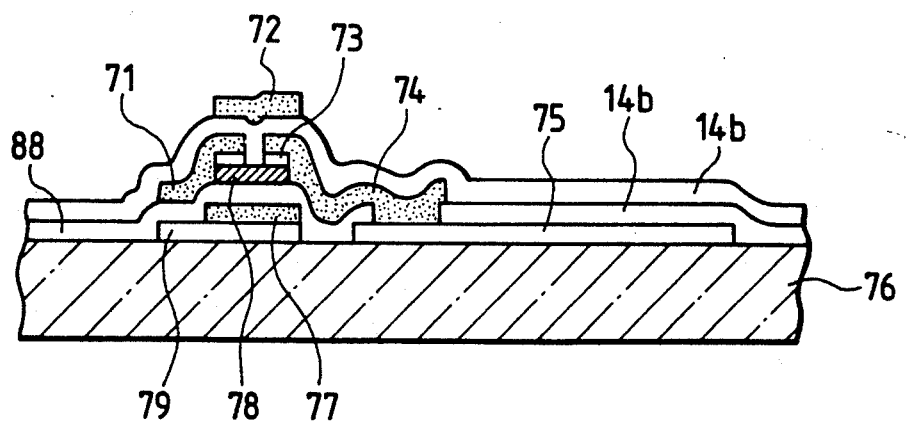
FIG. 15 is a cross-sectional illustration of an FET in a TFT used in the present invention.
Figure 16:
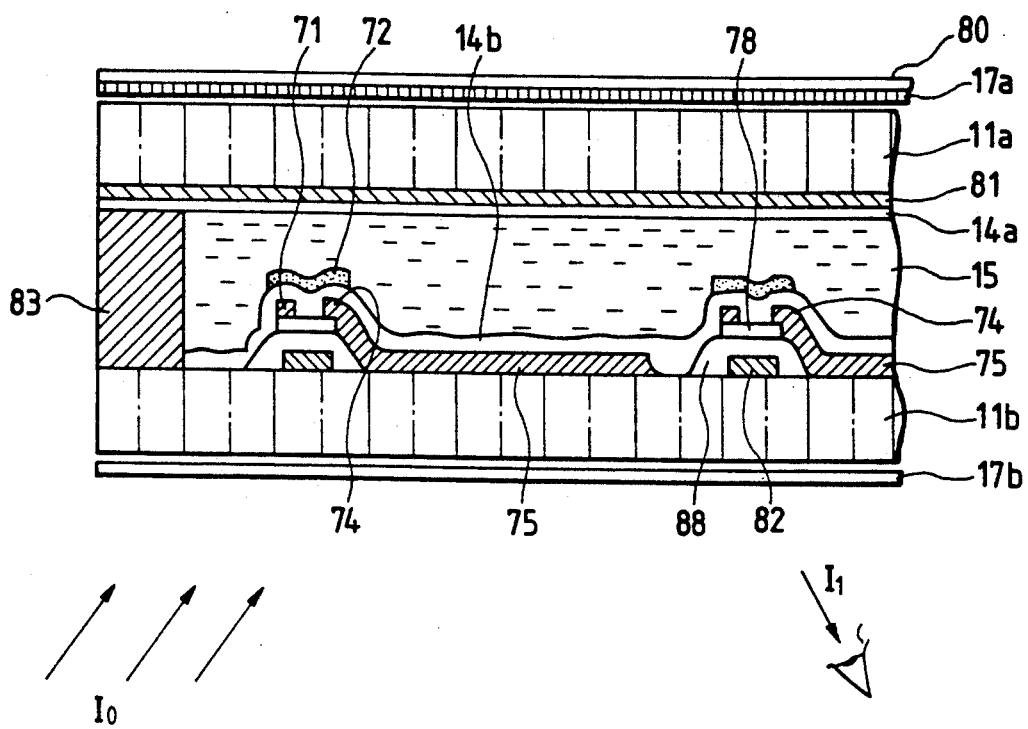
FIG. 16 is a cross-sectional illustration of a ferroelectric liquid crystal device cell in which the TFT is used.
Figure 17:
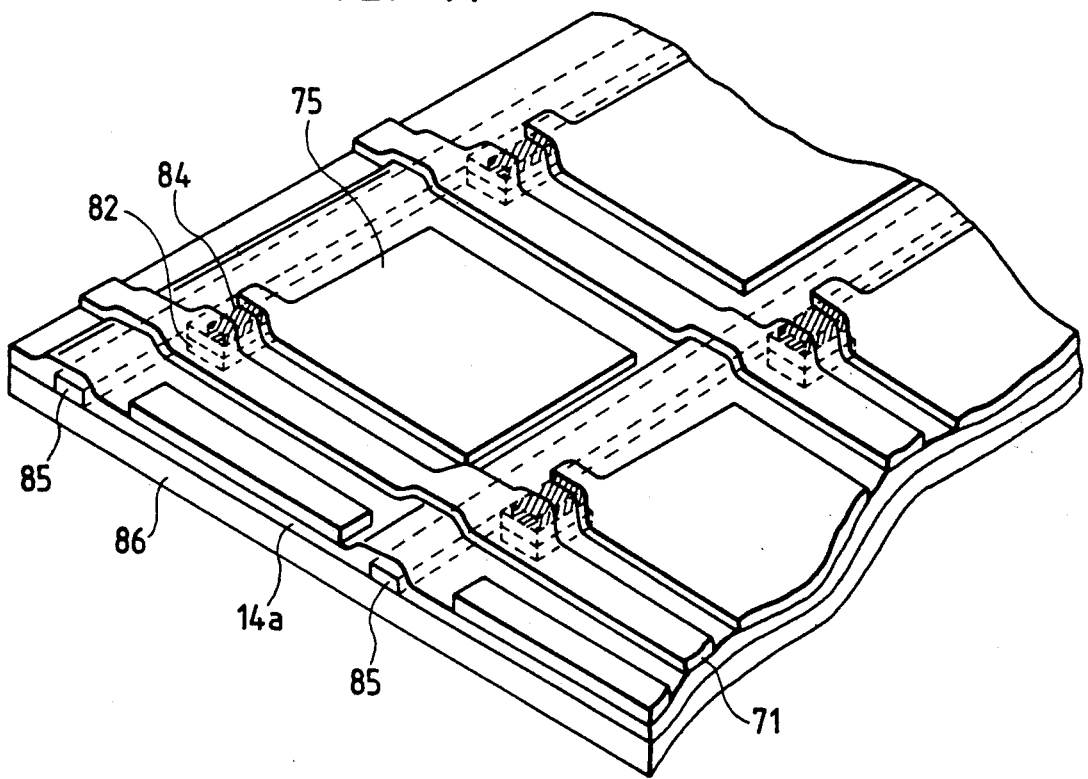
FIG. 17 is a perspective illustration of a TFT substrate.
Figure 18:
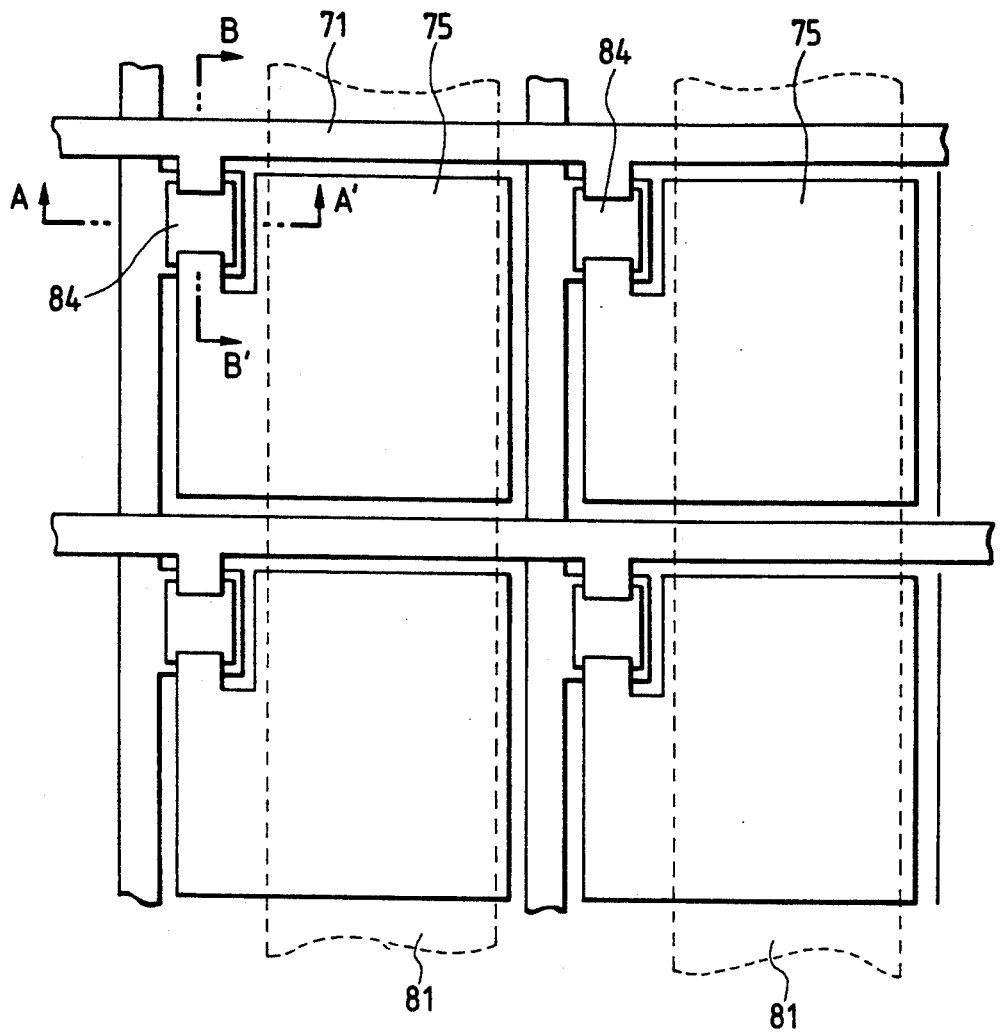
FIG. 18 is a plan view of the TFT substrate.
Figure 19:
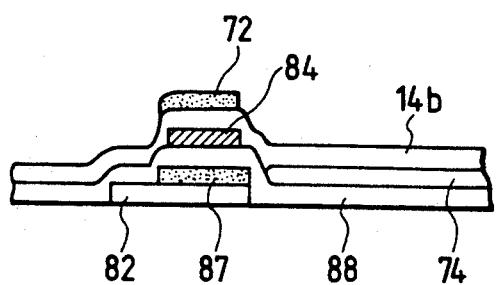
FIG. 19 is a partial cross-sectional view along the line A—A' in FIG. 18.
Figure 20:
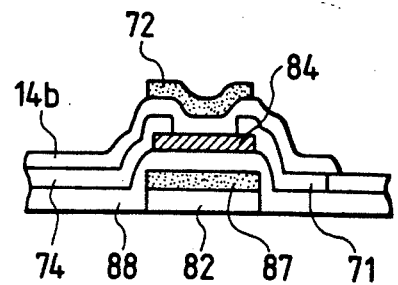
FIG. 20 is a partial cross-sectional view along the line B—B' in FIG. 18.

FIG. 15 cross-sectionally illustrates an FET (field effect transistor) in a TFT (thin film transistor) used in the present invention. FIG. 16 cross-sectionally illustrates a ferroelectric liquid crystal cell in which the TFT is used. FIG. 17 perspectively illustrates a TFT substrate. FIG. 18 is a plan view of the TFT substrate. FIG. 19 is a partial cross-sectional view along the line A—A' in FIG. 18, and FIG. 20 is a partial cross-sectional view along the line B—B' in FIG. 18. All the above drawings (FIGS. 15 to 20) illustrate an embodiment of the present invention.

FIG. 16 shows an example of the liquid crystal device provided with the alignment film of the present invention. The device comprises a substrate 11b made of glass, plastic or the like and, formed thereon, a semiconductor film 78 formed interposing a gate electrode 82 and an insulating film 88, a TFT comprised of two terminals 71 and 74 coming in contact with this semiconductor film 78, and a picture element electrode 75 (ITO, indium tin oxide) connected with the terminal 74 of the TFT. An alignment film 14b and also a light-screening film 72 made of aluminum, chromium or the like are further provided thereon. An opposing electrode 81 (ITO, indium tin oxide) and an alignment film 14a are formed on a substrate 11a that serves as an opposing substrate.

A liquid crystal 15, which is the liquid crystal rendering a chiral smectic phase as previously described, is held between these substrates 11a and 11b. A sealing material 83 that seals the chiral smectic liquid crystal 15 is provided on the periphery of these substrates 11a and 11b.

Polarizers 17a and 17b in the state of crossed nicols are disposed on both sides of the liquid crystal device of such a cell structure. A reflective plate 80 (an irregularly reflective aluminum sheet or plate) is provided on the back of the polarizer 17a so that an observer can view the state of display through reflected light Il of incident light $I_O$.

In FIGS. 15 to 20, the reference numerals denote as follows:
71, a source electrode (a drain electrode);
72, a light-screening film;
73, an $n^+$ layer;
74, a drain electrode (a source electrode);
75, a picture element electrode;
76, a substrate;
77, a light-screening film right beneath a semiconductor;
78, a semiconductor;
79, a transparent electrode at a gate-wired portion:
80, a reflective plate;
81, an opposing electrode;
82, a gate electrode;
83, a sealing material;
84, a thin-film semiconductor;
85, gate wiring;
86, a panel substrate;
87, a gate having a light-screening effect; and
88, an insulating layer.

In the above drawings, the source electrode and the drain electrode are referred to as those limited to instances in which electric currents flow from the drain to the source. Also possible is an instance in which the source acts as the drain depending on the action of the FET.

Figure 21:
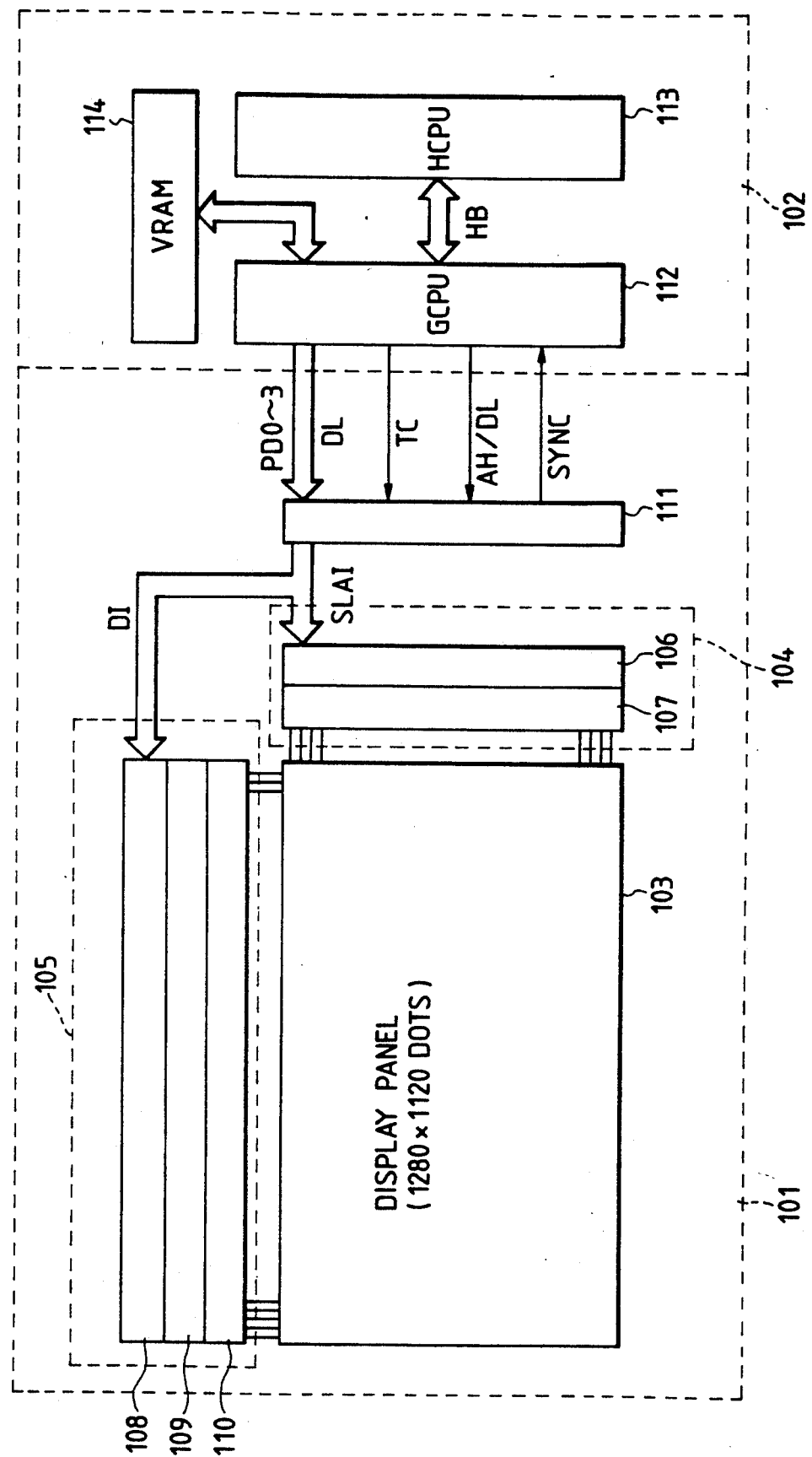
FIGS. 21 and 22 illustrate a liquid crystal display system having a communication synchronizing means.
Figure 22:
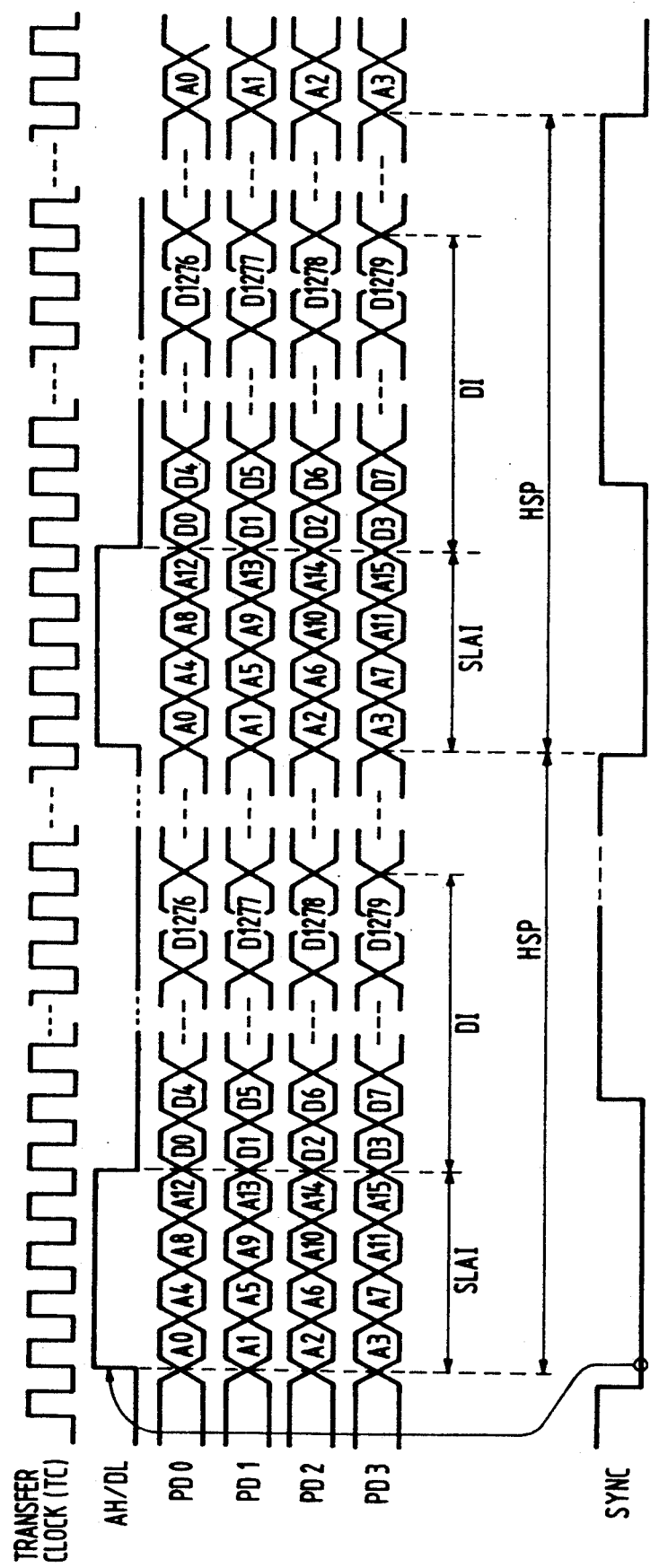

A liquid crystal display system can be set up by employing the liquid crystal device of the present invention at a display panel and providing a communication synchronizing means as shown in FIGS. 21 and 22 that operates according to an image information data format having scanning line address information, and SYNC signals.

In FIGS. 21 and 22, the reference numerals and symbols denote as follows:
101, a ferroelectric liquid crystal display system:
102 a graphics controller:
103, a display panel;
104, a scanning line drive circuit;
105, an information line drive circuit;
106, a decoder;
107, a scanning signal generating circuit;
108, a shift register;
109, a line memory;
110, an information signal generating circuit;
111, drive control circuit;
112, GCPU
113, a host CPU;
114, VRAM;
HB, host bus
DI, display information;
SLAI, scanning line address information;
DL, a data line;
TC, a transfer clock; and
HSP, horizontal scanning period.

Image information is generated by means of the graphics controller 102 provided on the main system side, and transferred to the display panel 103 through the signal transfer means shown in FIGS. 21 and 22. The graphics controller 102 governs the management and communication of image information between the host CPU (host central processing unit, HCPU in the drawing) 113 and the liquid crystal display system 101, using the CPU (central processing unit, GCPU in the drawing) and the VRAM (video random access memory) 114 as main units. The controlling in the present invention is mainly carried out on this graphics controller 102. Further, a light source is provided on the back-side of the display panel.

EXAMPLES

The present invention will be described below in greater detail by giving Examples.

Example 1

Two sheets of 1.1 mm thick glass plate each provided with a 1,500 Å thick ITO film and a 600 Å thick $Ta_2O_5$ film formed thereon were prepared as substrates. The respective substrates were cleaned by ultrasonic cleaning using isopropyl alcohol and then left to stand for 24 hours in saturated vapor of hexamethyldisilazane (HMDS) to carry out hydrophobic treatment. Subsequently, on each substrate thus treated, a conductive polymeric alignment film was formed using the Langmuir-Brodgett process. The process of forming the alignment film was as detailed below.

An aqueous solution of 20 mol/lit. of a polymeric sulfonium salt represented by the formula (2) obtained by condensation polymerization of p-xylylene represented by the formula (1), carried out in an aqueous alkali solution, was diluted to 1/10 with ethanol, and further diluted to a concentration of 1 mol/lit. with 1,1,1-trichloroethane. Next, this dilute solution was mixed with a solution of sodium perfluorononanate previously prepared in a concentration of 1 mol/lit. using a 1:1 mixed solvent of ethanol and 1,1,1-trichloroethane. A polymeric compound represented by the formula (3) was thus obtained, which was used as a spread solution.

Next, the resulting solution was spread over pure water of 20° C. in water temperature to form a monomolecular film on the water surface. After evaporation of the solvent, the surface pressure of the monomolecular film formed was increased to 25 mN/m. While keeping constant the surface pressure, the substrate was vertically immersed and drawn up at a rate of 10 mm/min to effect build-up of an eight-layer y-type monomolecular film on the substrate.

This substrate on which the polymeric sulfonium salt had been built up was treated at 200° C. for 2 hours under reduced pressure (about 1 Torr), thereby converting the built-up film into the poly(p-phenylenevinylene) represented by the formula (4) to give an alignment film.

Thereafter, alumina beads with an average particle diameter of about 1.5 μm were sprayed on one of the glass substrates. Then, the two sheets of glass substrates were put together in such a way that the axes of the directions in which the respective substrates were drawn up were in parallel and in the same direction each other. A liquid crystal cell was thus fabricated.

Into the resulting cell, a ferroelectric smectic liquid crystal "CS-1014" (trade name; a product of Chisso Corporation) was vacuum-injected in the state of an isotropic phase, and then cooled to 30° C. at a rate of 0.5° C./hr from the state of the isotropic phase. Thus, it was possible to align the liquid crystal in the cell of the present Example in which this "CS-1014" was used, the phase changes occurred as follows:

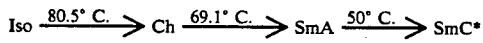

(Iso: isotropic phase, Ch: cholesteric phase, SmA: smectic A phase, SmC*: chiral smectic C phase)

The above liquid crystal cell was inserted between a pair of 90° crossed nicols polarizers. Thereafter, a 30 V pulse for 50 μsec was applied thereto and then the 90 crossed nicols were set to the position of extinction (a darkest state). Transmittance at this time was measured using a photomultiplier. Subsequently, a −30 V pulse for 50 μsec was applied, and transmittance at this time (a bright state) was measured in the same manner. As a result it was revealed that the tilt angle $\theta$ was 15°, the transmittance in the darkest state was 0.9 %, and on the other hand the transmittance in the bright state was 45%. Hence the ratio of contrast was 50:1. The delay in optical response that causes an after-image was 0.2 second or less.

Figure 13:
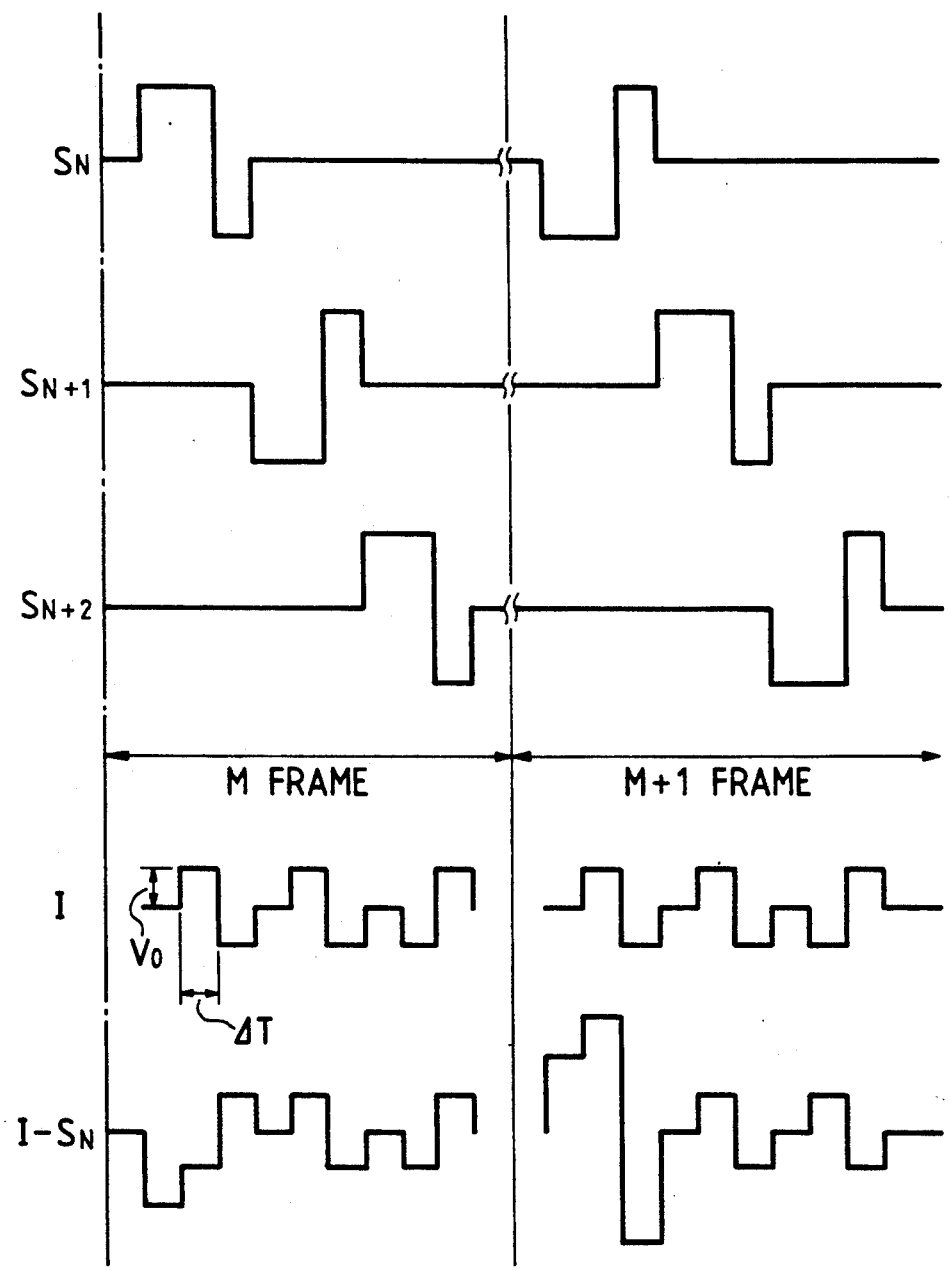
FIG. 13 illustrates wave forms of a drive voltage used in Examples of the present invention.

Using this liquid crystal cell, display was carried out according to multiplexing drive in which the drive wave forms as shown in FIG. 13 were used. As a result, a display with a high contrast and high grade was obtained. After an image was displayed by inputting given characters, the whole screen was turned off to a white state to confirm that no after-image was seen to have occurred. The letter symbols $S_N$, $S_{N+1}$ and $S_{N+2}$ in FIG. 13 represent wave forms of the voltages applied to scanning lines. The letter symbol I represents a wave form Of the voltage applied to a typical information line. I-$S_N$ is a synthetic wave form of the voltage applied to the crossing area of the information line I and the scanning line $S_N$. In the present Example, experiments were made under conditions of $V_0 = 5$ V to 8 V and $\Delta T = 20$ μsec to 70 μsec.

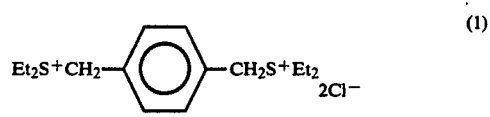

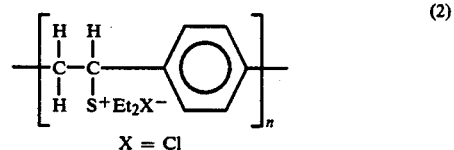

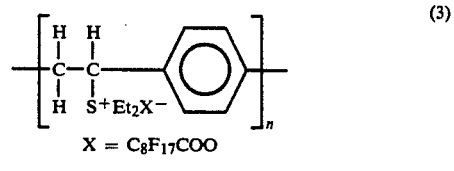

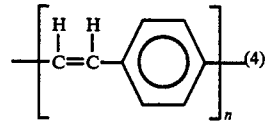

In the formulas, Et represents $CH_3CH_2$.

Example 2

The same substrates as used in Example 1, each provided with an ITO film and a $Ta_2O_5$ film formed thereon were cleaned by ultrasonic cleaning using isopropyl alcohol and then left to s&and for 24 hours in saturated vapor of HMDS to carry out hydrophobic treatment. Subsequently, the substrates thus treated were fitted to a substrate holder of a vacuum deposition apparatus. A polyparaphenylene sulfide (herein after "PPS") powder, Lighton V-1 (a product of Philips Co.) in an amount of 50 mg was also put in a tungsten boa-±of this apparatus, and thereafter the vacuum chamber was evacuated to $3 \times 10^{-6}$ Torr.

Next, the tungsten boat was heated by electrification and kept at 180° C. On lapse of 5 minutes after the boat temperature reached 180° C., a shutter provided right beneath the substrates was opened for 1 minute to carry out deposition. The thickness of each film thus formed was measured by profilometry to reveal that it was 200 Å. This film was heated in $AsF_5$ of 0.1 in atmospheric pressure. Next, the film thus treated was subjected to rubbing to give an alignment film (penetration length of fiber tips in forcing: 0.4 mm; substrate feed rate: 12 mm/sec; substrate rotational number: 1,000 rpm).

Thereafter, a liquid crystal cell was fabricated in the same manner as in Example 1, and evaluation was made. As a result, the same good results as in Example 1 were obtained. Display was carried out according to the same multiplexing drive as in Example 1. As a result, the same good results as in Example 1 were obtained in respect of contrast and after-image.

Example 3

Substrates each provided with an ITO film and a Ta$_2$O$_5$ film formed thereon, in the same manner as in Example 1, were cleaned by ultrasonic cleaning using isopropyl alcohol and then left to stand for 24 hours in saturated vapor of HMDS to carry out hydrophobic treatment. Subsequently, on each substrate thus treated, a conductive polymeric alignment film was formed using the Langmuir-Brodgett process. The process of forming the alignment film was as detailed below.

A polyparaphenylene precursor represented by the formula (5) (R=OCH$_3$) was dissolved in N-methyl-2-pyrrolidone (in concentration of 1×10$^{-3}$ M in terms of the monomer) to give a spread solution.

Next, the resulting solution was spread over an aqueous phase comprised of pure water of 20° C. in water temperature to form a monomolecular film on the water surface. After removal of &he solvent by evaporation, the surface pressure of the monomolecular film was increased to 25 mN/m. While keeping constant the surface pressure, the above substrate was gently immersed at a rate of 3 mm/min in the direction crossing the water surface, and thereafter subsequently gently drawn up at a rate of 3 mm/min, thus making a two-layer y-type monomolecular built-up film. This operation was repeated to form a monomolecular built-up film with 8 layers, comprised of the polyparaphenylene precursor.

Subsequently, such a substrate was heated to obtain a polyparaphenylene monomolecular built-up film of the formula (6), converted from the polyparaphenylene precursor. This was carried out in the following procedure: First, the precursor film was heated at 170° C. for 30 minutes to effect pre-drying, and then heated in an N$_2$ atmosphere at a rate of temperature rise of about 15° C./min until the temperature reached 400° C. Having reached 400° C. the temperature of 400° C. was kept for 10 minutes. The film was thereafter left &o cool until the temperature reached room temperature.

Using the substrate thus obtained, a liquid crystal cell was fabricated in the same manner as in Example 1, and evaluation was made. As a result, the same good results as in Example 1 were obtained. As to the R in the formula (5), it was not limitative to that used in the present Example, and the same good results were obtained also when, for example, R=OCH$_2$CH$_3$, OCH(CH$_3$)$_2$ or O(CH$_2$)$_2$CH$_3$.

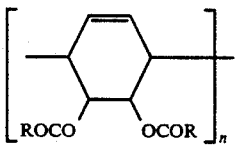

(5)

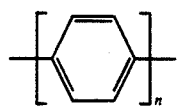

(6)

Example 4

A liquid crystal device prepared in the same manner as in Example 1 except that a polyparaphenylene precursor wherein the R in Formula (5) in Example 3 was changed for (CH$_3$)$_2$CHCH$_2$ was used. The device was evaluated in the same manner as in Example 1. As a result, substantially the same good characteristics were obtained. As to the R, it was not limitative to that in the present Example, and the same good results were obtained also when, for example, R=(CH$_3$)$_2$CH, (CH$_3$)$_3$C or CH$_3$(CH$_2$)$_n$ (n=1 to 20).

Example 5

Substrates each provided with an ITO film and a Ta$_2$O film formed thereon, in the same manner as in Example 1, were spin-coated (at 7000 rpm for 120 seconds) with a N-methyl-2-pyrrolidone solution (16%) of the polyparaphenylene precursor represented by the formula (5) as used in Example 3, followed by the same heating treatment as in Example 3 to form coating films Of 5,000 Å thick comprised of polyparaphenylene. The resulting coating films were subjected to rubbing under the same conditions as in Example 2. A liquid crystal device fabricated in the same manner as in Example 4 using the substrates provided with the coating films thus treated was evaluated in the same manner as in Example 1. As a result, the same good results as in Example 1 were obtained.

Results on the contrast and after-image in the display carried out by the multiplexing drive were also the same as in Example 1. As to the R, it was not limitative to that in the present Example, and the same good results were obtained also when, for example, R=OCH$_2$CH$_3$, OCH(CH$_3$)$_2$ or O(CH$_2$)$_2$CH$_3$.

As having been described above, the liquid crystal device of the present invention has the effect that it can produce a large tilt angle particularly in the non-spiral structure of chiral smectic liquid crystals, can achieve a high contrast between a bright state and a dark state, in particular, can achieve a very high display contrast in multiplexing drive to obtain a display of high quality level, and also may not cause the after-image phenomenon that is offensive to the eye.

We claim:

1. A liquid crystal device, comprising:
   a pair of opposing substrates; and
   a liquid crystal rendering a chiral smectic phase disposed between said pair of substrates, at least one of said substrates having an alignment film that exhibits an electrical conductivity of at least 10$^{-8}$ $\Omega^{-1}$cm$^{-1}$;
   said alignment film comprising a polymer having a phenylenevinylene or phenylene sulfide skeleton.

2. A liquid crystal device according to claim 1, wherein said alignment film is formed according to Langmuir-Blodgett process.

3. A liquid crystal device according to claim 2, wherein said alignment film has a thickness of 4–80 Å.

4. A liquid crystal device according to claim 1, wherein said alignment film has been subjected to rubbing.

5. A liquid crystal device according to claim 1, wherein said pair of substrates are disposed with a space corresponding to the thickness of a liquid crystal layer so that the liquid crystal layer may have a thickness in which the spiral structure of liquid crystal molecules has come loose.

6. A liquid crystal device according to claim 1, wherein an insulating layer is provided between said substrate and said alignment film.

7. A liquid crystal device according to claim 6, wherein said insulating layer comprises SiO$_2$, TiO$_2$ or Ta$_2$O$_5$.

8. A display system, comprising:
a display panel comprising a liquid crystal device according to claim 1; and
communication synchronizing means for generating image information and transferring said image information to said liquid crystal device.

9. A display system according to claim 8, which further comprises a drive circuit for said liquid crystal device.

10. A display system according to claim 9, wherein said drive circuit is a drive circuit driven in an active matrix constitution.

11. A display system according to claim 10, which further comprises a light source.

12. A liquid crystal device, comprising:
a pair of opposing substrates and a liquid crystal rendering a chiral smectic phase disposed between said pair of substrates,
wherein at least one of said substrates is provided with an alignment film that exhibits an electrical conductivity of greater than $10^{-3}\ \Omega^{-1}cm^{-1}$, said alignment film comprising a polymer having a phenylenevinylene or phenylene sulfide skeleton and
wherein an insulating layer comprising a material selected from the group consisting of $SiO_2$, $TiO_2$ and $Ta_2O_5$ is provided between said substrate and said alignment film.

13. A liquid crystal device according to claim 12, wherein said alignment film is formed by a Langmuir-Blodgett method.

14. A liquid crystal device according to claim 13, wherein said alignment film has a thickness of 4–80 Å.

15. A liquid crystal device according to claim 12, wherein said alignment film has been rubbed.

16. A liquid crystal device according to claim 12, wherein said alignment film is a rubbed coating film.

17. A display system, comprising:
a liquid crystal device comprising a pair of opposing substrates and a liquid crystal rendering a chiral smectic phase disposed between said pair of substrates; and
communication synchronizing means for generating image information and transferring said image information to said liquid crystal device,
wherein at least one of said substrates is provided with an alignment film that exhibits an electrical conductivity of greater than $10^{-8}\ \Omega^{-1}cm^{-1}$, said alignment film comprising a polymer having a phenylenevinylene or phenylene sulfide skeleton; and
wherein an insulating layer comprising a material selected from the group consisting of $SiO_2$, $TiO_2$ and $Ta_2O_5$ is provided between said substrate and said alignment film.

18. A display system according to claim 17, which further comprises a drive circuit for said liquid crystal device.

19. A display system according to claim 18, wherein said drive circuit is a drive circuit driven in an active matrix constitution.

20. A display system according to claim 19, which further comprises a light source.

21. A display method, comprising the steps of:
selecting a liquid crystal device comprising a pair of opposing substrates and a liquid crystal rendering a chiral smectic phase disposed between said pair of substrates, wherein at least one of said substrates is provided with an alignment film that exhibits an electrical conductivity of at least $10^{-8}\ \Omega^{-1}cm^{-1}$;
said alignment film comprising a polymer having a phenylenevinylene or phenylene sulfide skeleton; and
displaying information by driving said liquid crystal.

22. A display method according to claim 21, comprising the further step of selecting a liquid crystal device wherein said alignment film is formed according to a Langmuir-Blodgett process.

23. A liquid crystal device according to claim 22, wherein said alignment film has a thickness of 4–80 Å.

24. A display method according to claim 21, wherein said alignment film is formed according to a Langmuir-Blodgett process; wherein said alignment film has been subjected to rubbing.

25. A display method according to claim 21, wherein said alignment film is formed according to a Langmuir-Blodgett process; wherein said pair of substrates are disposed with a space corresponding to the thickness of a liquid crystal layer so that the liquid crystal layer may have a thickness in which the spiral structure of liquid crystal molecules has come loose.

26. A display method according to claim 25, wherein the display is carried out by electrically driving said liquid crystal molecules.

27. A display method according to claim 26, wherein said driving is carried out using a drive circuit driven in an active matrix constitution.

28. A liquid crystal device according to claim 21, wherein an insulating layer is provided between said substrate and said alignment film.

29. A liquid crystal device according to claim 28, wherein said insulating layer comprises $SiO_2$, $TiO_2$ or $Ta_2O_5$.

* * * * *

UNITED STATES PATENT AND TRADEMARK OFFICE
CERTIFICATE OF CORRECTION

PATENT NO. : 5,239,398
DATED : August 24, 1993
INVENTOR(S) : YOSHIHIRO YANAGISAWA, ET AL.

It is certified that error appears in the above-identified patent and that said Letters Patent is hereby corrected as shown below:

TITLE PAGE
IN [54] TITLE

"PARTICULAR" should read --PARTICULARLY--.

COLUMN 1

Line 5, "PARTICULAR" should read --PARTICULARLY--.
    Line 20, "type" should read --type wherein--.
    Line 37, "applicable" should read --to be applicable--.
    Line 62, "twisting" should read --twistingly--.
    Line 65, "22.5 ." should read --22.5°.--.

COLUMN 2

Line 46, "adjacent&" should read --adjacent--.
    Line 64, "e" should read --a--.

COLUMN 3

Line 1, "yoshida Akio." should read --Yoshida Akio,--.
    Line 18, "substrate" should read --substrates--.
    Line 43, "Of" should read --of--.
    Line 45, "O-directors" should read --C-directors--.
    Line 46, "alighment&," should read --alignment,--.
    Line 47, "spray" should read --splay--.
    Line 50, "spray" should read --splay--.

COLUMN 4

Line 16, "FIG. I" should read --FIG. 1--.
    Line 23, "Of" should read --of--.
    Line 39, "Langmuir-Brodgett" should read --Langmuir-Blodgett--.

UNITED STATES PATENT AND TRADEMARK OFFICE
CERTIFICATE OF CORRECTION

PATENT NO. : 5,239,398

DATED : August 24, 1993

INVENTOR(S) : YOSHIHIRO YANAGISAWA, ET AL.

Page 2 of 5

It is certified that error appears in the above-identified patent and that said Letters Patent is hereby corrected as shown below:

COLUMN 4

Line 43, "Langmuir-Brodgett" should read --Langmuir-Blodgett--.
Line 51, "FIG. I)." should read --FIG. 1).--.
Line 68, "polybenzyI," should read --polybenzyl,--.

COLUMN 5

Line 3, "poly-2-vinylpyridene" should read --poly-2-vinylpyridene,--.
Line 4, "vinylnaphthalene." should read --vinylnaphthalene,--.
Line 30, "@f" should read --of--.
Line 32, "fi m" should read --film--.
Line 35, "substrate on which the" should be deleted.

COLUMN 6

Line 14, "&hat" should read --that--.
Line 27, "Of" should read --of--.
Line 53, "(31b)." should read --(31b),--.

COLUMN 7

Line 16, "subs&rate" should read --substrate--.
Line 36, "alignment")." should read --alignment"),--.
Line 38, "spray" should read --splay--.
Line 42, "Langmuir-Brodgett" should read --Langmuir-Blodgett--.
Line 46, "ment&" should read --ment-- and "$U_1$:" should read --$U_1$;--.

UNITED STATES PATENT AND TRADEMARK OFFICE
CERTIFICATE OF CORRECTION

PATENT NO. : 5,239,398
DATED : August 24, 1993
INVENTOR(S) : YOSHIHIRO YANAGISAWA, ET AL.

It is certified that error appears in the above-identified patent and that said Letters Patent is hereby corrected as shown below:

COLUMN 7

Line 52, "each other" should be deleted and "takes" should read --take--.

COLUMN 8

Line 23, "spray" should read --splay--.
Line 28, "spray" should read --splay--.
Line 31, " Ⓗ " should read -- Ⓗ ,--.
Line 36, "spray" should read --splay--.
Line 39, "angle θhas" should read --angle θ has--.
Line 41, "spray" should read --splay--.
Line 48, "spray" should read --splay--.
Line 54, "&he" should read --the--.
Line 61, "optical ?" should read --optical--.
Line 64, "ttime" should read --time--.

COLUMN 9

Line 6, "FIG. 1" should read --FIG. 1.--.
Line 30, "(ITO." should read --(ITO,--.
Line 44, "light I1" should read --light $I_1$--.
Line 57, "portion:" should read --portion;--.

COLUMN 10

Line 14, "system:" should read --system;--.
Line 15, "controller:" should read --controller;--.
Line 25, "112, GCPU" should read --112, GCPU;--.
Line 28, "bus" should read --bus;--.
Line 63, "Langmuir-Brodgett" should read --Langmuir-Blodgett--.

UNITED STATES PATENT AND TRADEMARK OFFICE
CERTIFICATE OF CORRECTION

PATENT NO. : 5,239,398

DATED : August 24, 1993

INVENTOR(S) : YOSHIHIRO YANAGISAWA, ET AL.

It is certified that error appears in the above-identified patent and that said Letters Patent is hereby corrected as shown below:

COLUMN 11

Line 48, "90" should read --90°--.
Line 54, "θwas" should read --θ was--.

COLUMN 12

Line 2, "Of" should read --of--.
Line 30, "——(4)" should read --  ——        (4)--.
Line 40, "s&and" should read --stand--.
Line 45, "(herein after" should read --(hereinafter--.
Line 47, "boa-" should read --boat--.
Line 48, "±of" should read --of--.

COLUMN 13

Line 10, "Langmuir-Brodgett" should read --Langmuir-Blodgett--.
Line 18, "&he" should read --the--.
Line 25, "y-type" should read --Y-type--.
Line 37, "400°C." (first occurrence) should read --400°C.,--.
Line 38, "&o" should read --to--.

COLUMN 14

Line 9, "$Ta_2Ofilm$" should read --$Ta_2O_5$ film--.

COLUMN 15

Line 21, "$10^{-3}\Omega^{-1}cm^{-1}$," should read --$10^{-8}\Omega^{-1}cm^{-1}$,--.
Line 23, "skeleton" should read --skeleton;--.

UNITED STATES PATENT AND TRADEMARK OFFICE
CERTIFICATE OF CORRECTION

PATENT NO. : 5,239,398

DATED : August 24, 1993

INVENTOR(S) : YOSHIHIRO YANAGISAWA, ET AL.

It is certified that error appears in the above-identified patent and that said Letters Patent is hereby corrected as shown below:

COLUMN 16

Line 12, "comprising" should read --comprises--.

Signed and Sealed this

Nineteenth Day of April, 1994

Attest:

BRUCE LEHMAN

Attesting Officer    Commissioner of Patents and Trademarks